United States Patent
Jing et al.

(10) Patent No.: US 8,032,544 B2
(45) Date of Patent: Oct. 4, 2011

(54) METHODS AND APPARATUS FOR GENERATING DYNAMIC PROGRAM FILES BASED ON INPUT QUERIES THAT FACILITATE USE OF PERSISTENT QUERY SERVICES

(75) Inventors: Yi Jing, Bellevue, WA (US); Alimuddin Mohammad, Redmond, WA (US); John F. Bremer, Jr., Bellingham, WA (US)

(73) Assignee: The Boeing Company, Chicago, IL (US)

( * ) Notice: Subject to any disclaimer, the term of this patent is extended or adjusted under 35 U.S.C. 154(b) by 410 days.

(21) Appl. No.: 12/236,640

(22) Filed: Sep. 24, 2008

(65) Prior Publication Data

US 2010/0082656 A1 Apr. 1, 2010

(51) Int. Cl.
*G06F 7/00* (2006.01)
*G06F 17/30* (2006.01)
(52) U.S. Cl. ........................................ 707/760; 707/804
(58) Field of Classification Search ........... 707/600–831
See application file for complete search history.

(56) References Cited

U.S. PATENT DOCUMENTS

| 5,499,371 | A | | 3/1996 | Henninger et al. | |
|---|---|---|---|---|---|
| 5,752,027 | A | | 5/1998 | Familiar | |
| 5,761,493 | A | * | 6/1998 | Blakeley et al. | 1/1 |
| 6,728,727 | B2 | * | 4/2004 | Komine et al. | 1/1 |
| 7,296,028 | B1 | | 11/2007 | Ivanova | |

OTHER PUBLICATIONS

Mitchell et al., An architecture for query processing in persistent object stores, Jan. 7-10, 1992, IEEE, 787-798.*

* cited by examiner

*Primary Examiner* — Jean B Fleurantin
(74) *Attorney, Agent, or Firm* — Armstrong Teasdale LLP (57) ABSTRACT

A method includes receiving a request for information from a relational database, translating the received request to at least one of an object and a relational persistent query, parsing the query to determine one or more of table names, attributes and attribute types, and generating at least one set of related files. The parsing results are used to update at least one configuration file to accept the related files for use by at least one of the object and the relational persistent query service, and execute at least one of the persistent query services based on the translated queries, wherein the persistent query services are programmed to receive the translated query. Based on the execution of the translated query, the results are either fetched from at least one of the object cache or retrieved from at least one of the database, stored, and the results are transmitted to the user.

18 Claims, 9 Drawing Sheets

METHODS AND APPARATUS FOR GENERATING DYNAMIC PROGRAM FILES BASED ON INPUT QUERIES THAT FACILITATE USE OF PERSISTENT QUERY SERVICES

BACKGROUND

The field of the disclosure relates generally to querying a relational database, and more specifically to querying a relational database using one or both of an external object and a relational persistent query service.

A database is a structured collection of records or data. A computer database relies upon software to organize the storage of data. The software models the database structure in what are known as database models. The model in most common use today is the relational model, also referred to as Structured Query Language (SQL) databases. Other models such as the hierarchical model and the network model use a more explicit representation of relationships. Database management systems (DBMS) are the software used to organize and maintain the database. These are categorized according to the database model that they support. The model tends to determine the query languages that are available to access the database. A great deal of the internal engineering of a DBMS, however, is independent of the data model, and is concerned with managing factors such as performance, concurrency, integrity, and recovery from hardware failures.

However, as the size of a database increases, in particular SQL relational databases, access latency increases accordingly. The most common solution to overcome this latency is to cache results of commonly queried SQL. A large amount of software has been developed to cache results of commonly queried SQL for two main reasons: to decrease the number of accesses to the database and increase the amount of data that is retrieved from each access. A type of software which is commonly used for this purpose is called an Object Persistent Query Service. Another software package is referred to as a Relational Persistent Query Service. These services are often used in combination with query and object caches. Many difficult implementation steps have been encountered in integrating Object and Relational Persistent Query Services capabilities into an application/web application. Furthermore, many detailed changes within an already operational application/web application have to be done manually, and this can be time consuming and impact the availability of the system for users. Also, both Object and Relational Persistent Query Services require resource files for mapping objects with database tables and caching results.

Thus, deploying Object/Oriented Persistent Query Service to application/web application is a time-consuming and laborious process in itself, which may sometimes be further aggravated by requiring the re-implementation of the entire application/web application. Current work on automating the process of creating object mapping files and program files uses the brute force method of creating mapping files for the entire database and corresponding object class files. The current process typically works from a database schema and is a static process and is not based on parsing the SQL query issued by the user application. The methodology of our invention is dynamic and begins with parsing of the SQL query issued by the user application to the database.

BRIEF SUMMARY

In one aspect, a computer-implemented method that is query-centric, for automating the process of querying a relational database using at least one of an object and a relational persistent query service on a processor is provided. The method includes receiving a request for information from the relational database from a user, translating the received request to at least one of an object and a relational persistent query, parsing the query to determine table names, attributes and attribute types, generating at least one set of related files, based on the parsing of the query, updating at least one configuration file for use by the respective object and relational persistent query services, and executing the respective object and relational persistent query services based on the respective object and relational persistent query. Each of the object and the relational persistent query services are programmed to receive the translated query, retrieve at least one result stored in at least one of an object cache or the relational database based on at least one of the translated query and the generated at least one set of related files, and transmit the results to the user.

In another aspect, a system for automating the process of querying a relational database using at least one of an object and a relational language query is provided. The system includes an input/output partition, a cache area, a processor, a network accessible by at least one user, wherein said network is coupled to the input/output partition, and a relational database. The relational database is coupled to the input/output partition, and the input/output partition and the cache area are coupled to the processor. The processor is programmed to receive a request for information from the relational database from a user via the input/output partition, translate the received request to at least one of an object and a relational persistent query, parse the query to determine table names, attributes and attribute types, generate at least one set of related files based on the parsed query, update at least one configuration file for use by respective object and relational persistent query services, and execute the respective object and relational persistent query service based on the respective object and relational persistent queries, wherein the object and relational persistent query services are operable to receive the translated query, retrieve at least one result stored in at least one of the cache area or the relational database based on at least one of the translated query and the generated at least one set of related files, and transmit the results to the user.

In still another aspect, an apparatus is provided. The apparatus includes an input/output partition comprising a network interface, an object cache communicatively coupled to the input/output partition, and a processor communicatively coupled to the input/output partition and comprising at least one of an object and a relational persistent query service running thereon. The input/output partition is operable for receiving requests from a user and for querying a relational database external to the apparatus. The apparatus is configured to receive a request for information from the relational database from a user via the input/output partition, translate the received request to at least one of an object and a relational persistent query, generate at least one set of related files based on the persistent query, execute the persistent query utilizing the respective persistent query services. The persistent query services are operable to retrieve at least one result stored in at least one of the object cache or the relational database based on at least one of the query and the generated at least one set of related files. The apparatus is operable to transmit the results to the user through the input/output partition.

BRIEF DESCRIPTION OF THE DRAWINGS

Aspects of the invention may be better understood by referring to the following descriptions in conjunction with the accompanying drawings.

DETAILED DESCRIPTION

The described embodiments, set forth below, enable an external layer of software on top of a current operational system/application to fully take advantage of one or more of object and relational persistent query services. This external layer of software provides a dynamic mechanism which involves parsing an SQL query string to determine table names, attributes, attribute types and relationships. The results of this parsing are used to generate class files and mapping files; and also to update the configuration file used by the object and relational persistent query services. At least one of the object and the relational persistent query service is then able to retrieve and store the results in cache and also transmit it to the user application. Aspects may be implemented with a device such as the processor shown in FIG. 2, which is further described herein.

In one described embodiment, a computer-implemented method that provides a purely dynamic query-based automation for at least one of an object and a relational persistent query service is described, as opposed to currently utilized methods which depend on static database schemas as input. The described approach provides automation for only those parts of the database which are exercised by the user queries, thus eliminating un-necessary mappings and object class generation.

Figure 1:
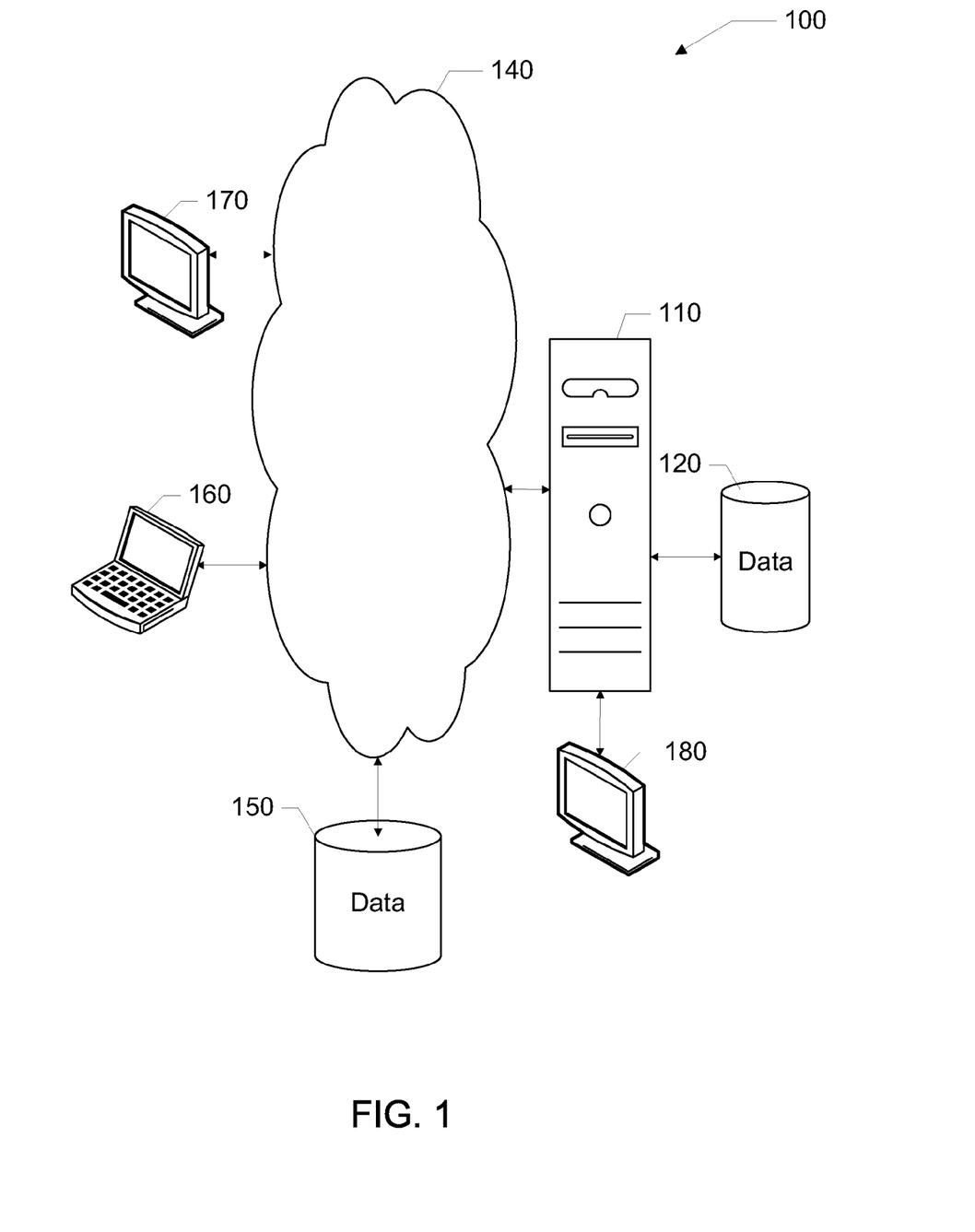
FIG. 1 is an exemplary block diagram of a networked system for accessing a relational database.

Now referring to FIG. 1, an exemplary system 100 illustrates a relational database server accessible via a network. As used herein, the term exemplary indicates an example and not necessarily an ideal. One or more servers 110 are directly coupled to a relational database 120. In another embodiment, the server 110 is directly coupled to more than one relational database. The relational database 120 may be any relational database such as, for example, relational databases produced by Oracle, Microsoft, IBM or any other vendor or it may be an internal implementation of a relational database. The server 110 is further coupled to a network 140. The network may be any type of network that will allow access to the server 110, such as, for example, an Ethernet, the Internet, a local area network (LAN), a wide area network (WAN) such as the Internet, a metropolitan area network (MAN), or any other type of network that is capable of providing access to the server 110.

The network 140 is coupled to a networked relational database 150 and to at least one client computer 160 and 170. In another embodiment, the network 140 is coupled to more than one database. The client computers 160 and 170 are used by users to access data within the relational database 120 or the networked relational database 150 using a form such as a web based form, an existing form or any other form that may be used to request data from the relational database 120 or the network database 150. Client computers 160 and 170 may be any kind of computer that provides an interface for a user to request information from a relational database such as, for example, a laptop computer, a desktop computer, a personal digital assistant (PDA), a smart phone, or any other device capable of providing an interface to a relational database.

The server 110 is also coupled to a computer console 180 with direct access to the server 110. The computer console 180 may be used by an administrator of the server 110 or an administrator of any of the relational database 120, the networked relational database 150, or any combination of the server 110, relational database 120, and networked database 150. The computer console 180 may be any kind of computer that provides an interface for an administrator or user to request information or modify information at the relational database 120, the networked database 180 or the server 110 such as, for example, a laptop computer, a desktop computer, a personal digital assistant (PDA), a smart phone, or any other device capable of providing access to a relational database or server.

Figure 2:
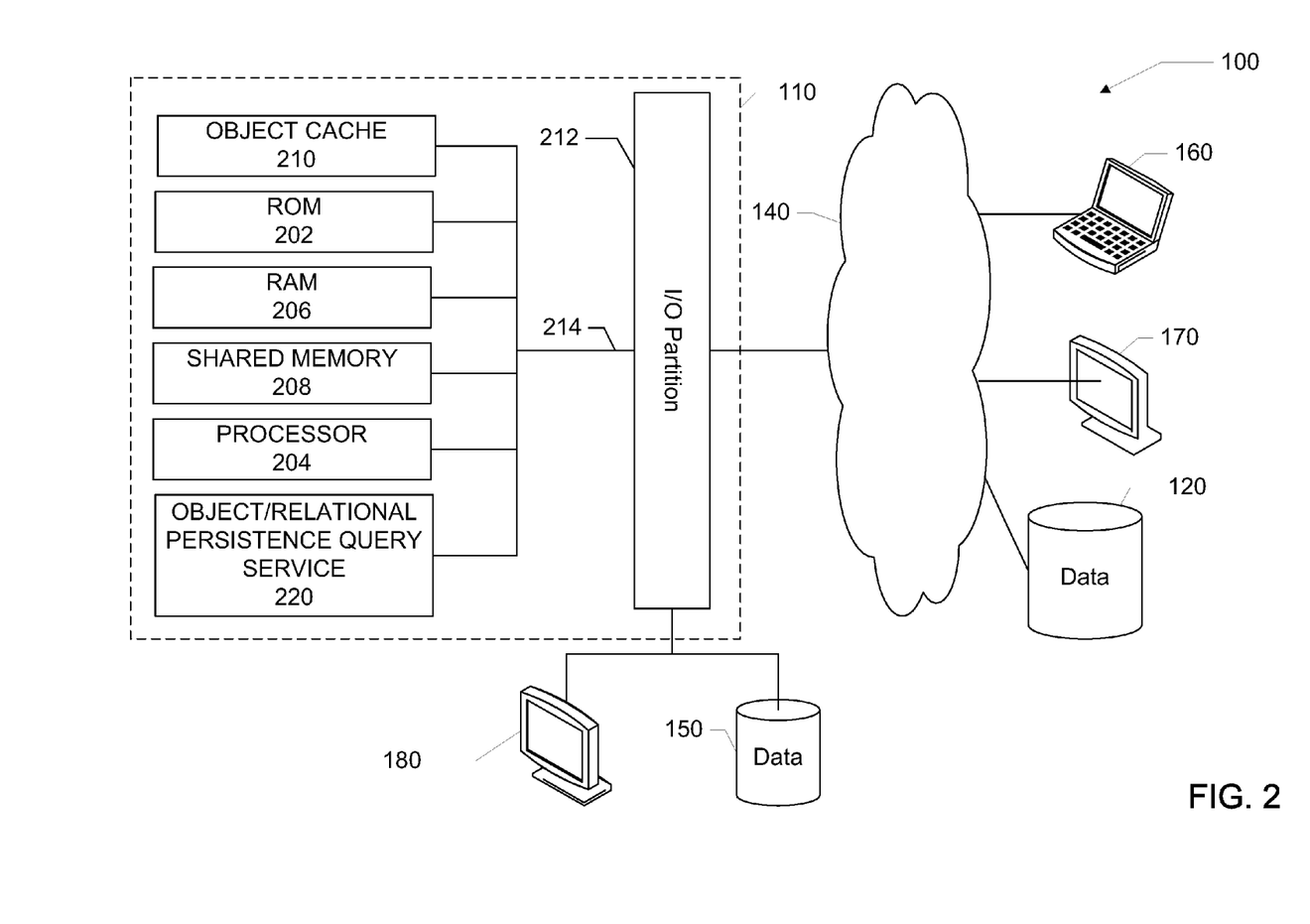
FIG. 2 is an exemplary block diagram of a system for accessing and retrieving information from a relational database using at least one of an object and a relational persistent query service.

Referring now to FIG. 2, an exemplary schematic layout illustrates a network system 100 that includes a detailed block diagram of server 110. Server 110 is capable of accessing relational databases 120 and 150. In the illustrated embodiment, the system 100 includes a server 110 that includes a read-only memory (ROM) 202, a microcontroller or microprocessor (MP) 204, a random-access memory (RAM) 206, a memory area such as shared memory area 208, an object cache 210 and an input/output (I/O) circuit 212, each coupled via an address/data bus 214. As used herein, the terms "controller" and "processor" may include any programmable system including systems using microcontrollers, reduced instruction set computer (RISC), application specific integrated circuits (ASICs), logic circuits, and any other circuit or processor capable of executing the functions described herein. The above examples are exemplary only, and are thus not intended to limit in any way the definition and/or meaning of the terms "controller" or "processor".

Alternative embodiments of server 110 may include more than one microprocessor 204, multiple RAM modules 206, and/or multiple ROM modules 202. Moreover, one of ordinary skill in the art will appreciate that I/O circuit 212 may include any number or a plurality of different types of I/O circuits. Further, RAM 206 and/or ROM 202 may be implemented as, for example, semiconductor memories, magnetically readable memories, and/or optically readable memories. In one embodiment, relational database 120 and network relational database 150 are coupled to I/O circuit 212 via network interconnections. Alternative embodiments may include a relational database 120 coupled to the network 140.

The processor is also coupled to at least one of an object and a relational persistent query service 220. In an alternative embodiment, the at least one of an object and a relational persistent query service 220 is directly coupled to the I/O circuit 212. In another embodiment, the at least one of an object and a relational persistent query service 220 is directly coupled to the network 140.

Figure 3:
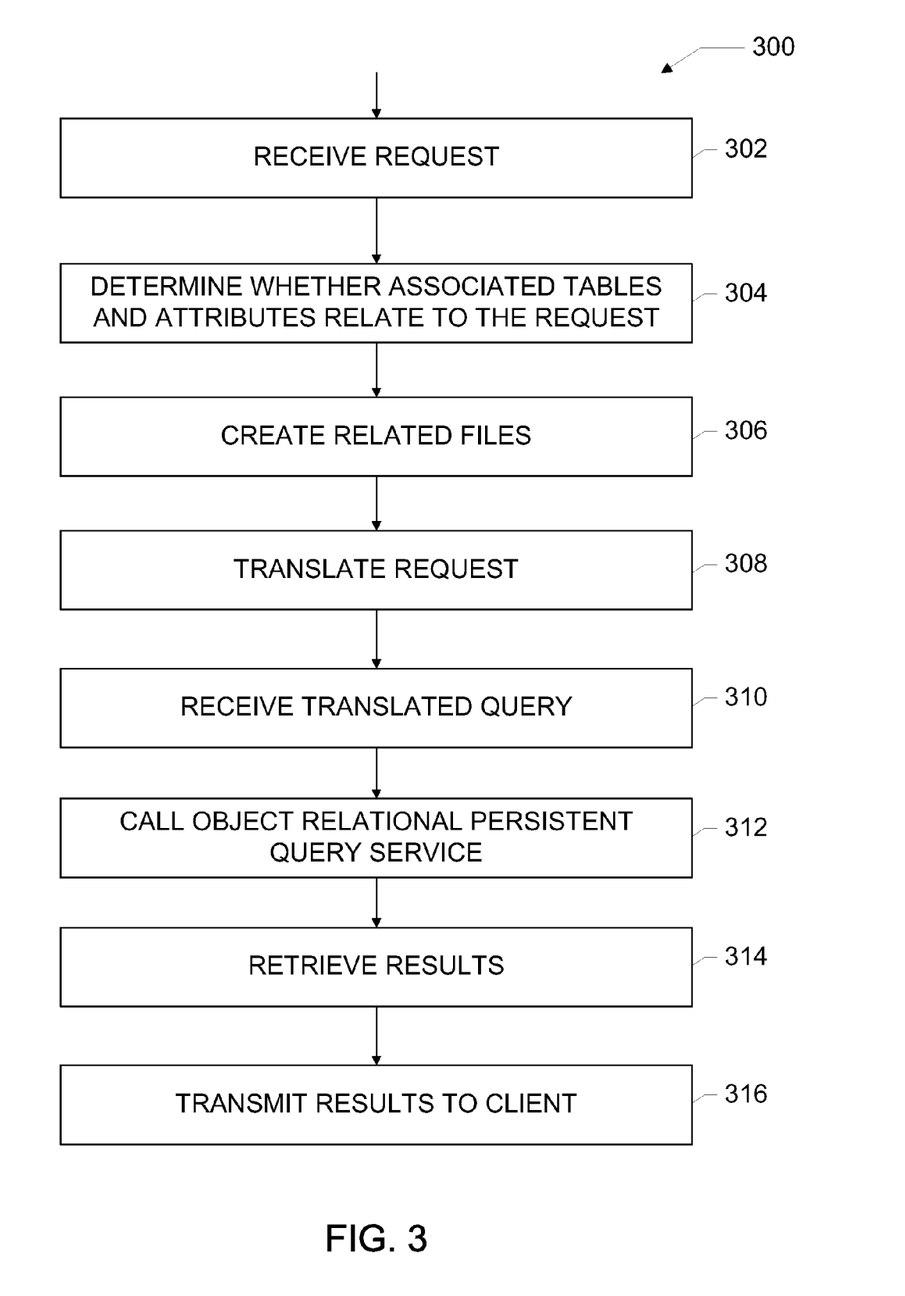
FIG. 3 is a flowchart illustrating a method for retrieving data from a relational database using at least one of an object and a relational persistent query.

Now referring to FIG. 3, an exemplary flowchart 300 illustrates the dynamic query based method for retrieving information from a relational database providing at least one of an object and a relational persistent query service at a server 110 (shown in FIG. 2). The dynamic query based method involves parsing of the user query, and automatically generating a set of related files to enable the functioning of the object and relational persistent query services. It also involves updating the configuration file used by the object and relational persistent query services to reflect the automatically generated related files.

A request from a client computer 160 is received 302 at the server 110. Although only one request is shown in flowchart 300, one of ordinary skill would readily ascertain that more than one request may be received at the server 110 and acted upon either during parallel processing of the request or retrieved from an input/output buffer in the order the request are received or in a prioritized order. The request may be in any format and/or type to query a relational database such as, for example, Structured Query Language (SQL). The server 110 determines 304 whether the associated tables and attributes relate to the request. The server 110 then creates 306 related files including object class, mapping file, and object cache configuration file; furthermore, it also updates at least one of an object and a relational persistent query service configuration file. The server 110 then translates 308 the request into a persistent query service format. It should be noted that the translation step 308 is an independent process and can occur any time between the receiving step 302 and the creation step 306 and even in parallel with other processes during this time period such as with the determination step 304. The server 110 then receives 310 the translated request as a translated query. The server 110 then calls 312 one or both of the object and the relational persistent query service 220.

An object and relational query service partition executing on the server 110 retrieves 314 the results from one of the relational databases or from a object cache 210 if a previous query had already retrieved the table names, attributes, and attribute types and created the mapping files, and classes necessary for this particular query. Once the results have been retrieved 314, the results are transmitted 316 from the server 110 to the client computer 160 for review by the user.

Figure 4:
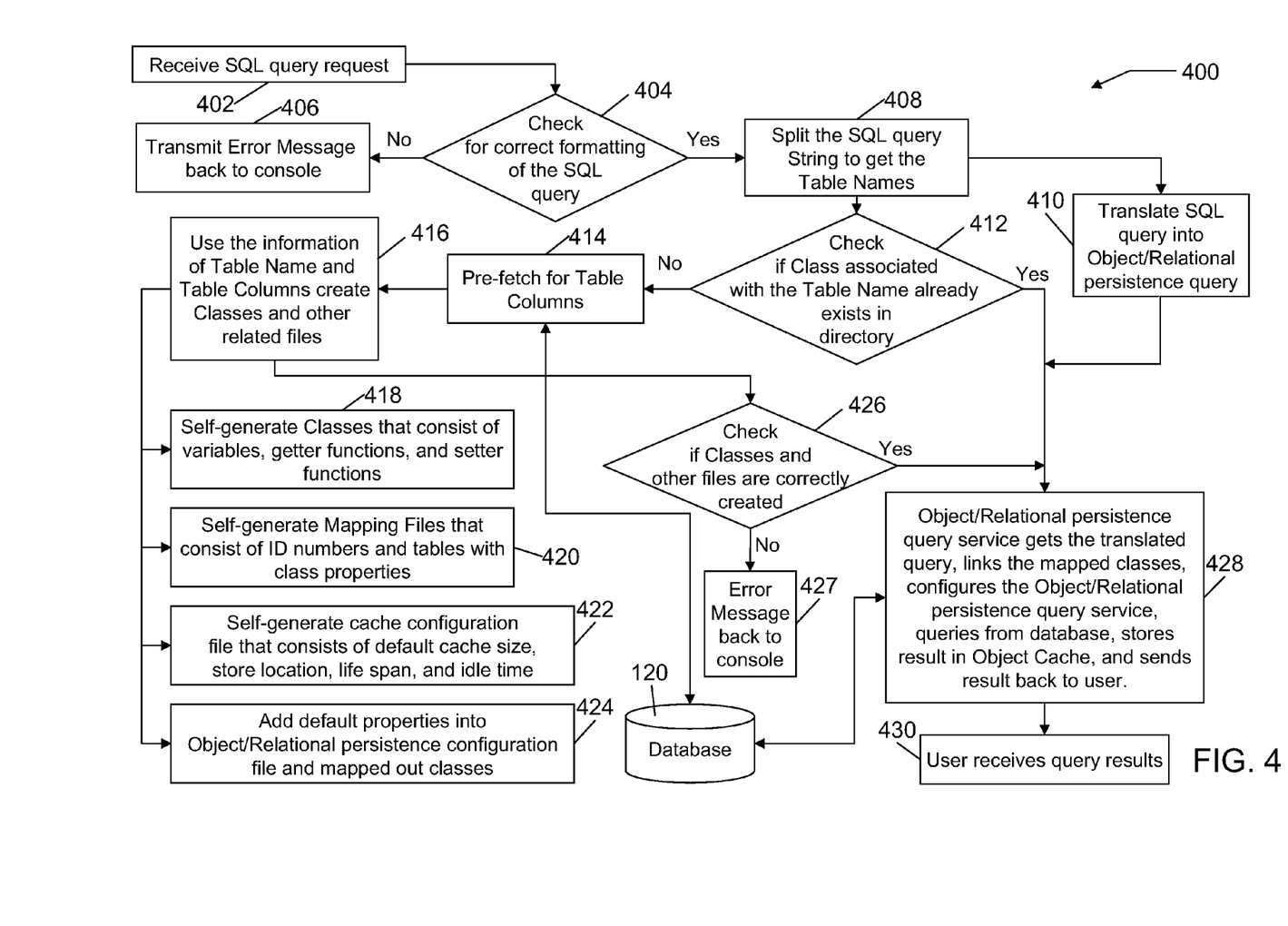
FIG. 4 is a flowchart illustrating a programmatic process for a dynamic query-centric method.

Now referring to FIG. 4, an exemplary flowchart 400 illustrates a method for retrieving data from an SQL relational database where the request is translated to retrieve the information using at least one of an object and a relational query service at the server 110 (shown in FIG. 2). The flow chart provides details of a query-centric approach which involves; first parsing the query to retrieve information about table names, attributes, and attribute types; and second to generate class and mapping files; and third to update the configuration file used by respective object and relational persistent query services. FIG. 4 also illustrates the generation of the cache configuration file, which is usually generated only once, when one of the object and relational persistent query services is first used.

The server 110 receives 402 an SQL query request from a client computer 160 coupled to the network 140, where the network is coupled to the I/O circuit 212 (shown in FIG. 2). The server 110 determines 404 if the SQL query is correctly formatted. If the server 110 determines 404 that the SQL query is not correctly formatted, an error message is transmitted 406 from the server 110 to the client computer 160 via the network 140 for viewing by the user. If the server 110 determines 404 the SQL query is correctly formatted, the SQL query string is split to determine 408 the Table Names to search. The server proceeds to translate 410 the SQL query into at least one of an object and a relational persistent query and determines 412 in parallel if the class associated with the Table Name already exists in a directory on the server 110.

If the server 110 determines 412 that the class associated with the table name does not already exist in a directory on the server 110, a pre-fetch for the table columns is performed 414 on the relational database 120. After the pre-fetch 414 of the table columns is completed, the server 110 uses the table names and table columns to create 416 classes and other related files for the SQL query. Once the classes and other related files have been created 416 by the server 110, the server self-generates 418 classes that include information consistent with the classes such as, for example, variables, and functions. Additionally, the server 110 self-generates 420 mapping files that include information consistent with information related to the mapping files such as, for example, identification numbers and tables with class properties. Further, the server 110 self-generates 422 a cache configuration file that includes information consistent with the configuration of the cache such as, for example, a default cache size, store location, life span, and idle time. Moreover, the server 110 adds 424 default properties into the respective object and relational persistent configuration files and mapped out classes.

After the server 110 has created 416 classes and other related files from the table names and table columns, the server 110 determines 426 if the classes and other related files have been created correctly. If the server 110 determines 426 that either the classes or any of the other related files have been incorrectly created 416, the server 110 returns 427 an error message to the client computer 160 via the network 140 for viewing by the user.

If the server 110 has determined 412 that classes associated with the table name already exists in a directory or the server 110 has determined 426 that the classes and other files have been correctly created 416, the server 110 executes the at least one of an object and a relational persistent query service 428 with the persistent query translated 410 from the SQL query request. The query service 428 receives the translated query and links the mapped classes, configures the one or more of the object and the relational persistent query service, queries the database 120, stores the result in the object cache 210 and returns the results via the server 110 to the client computer 160 using the network 140 for viewing by the user. The client computer 160 receives 430 the results from the server 110 and the one or more of the object and the relational persistent query service.

Figure 5:
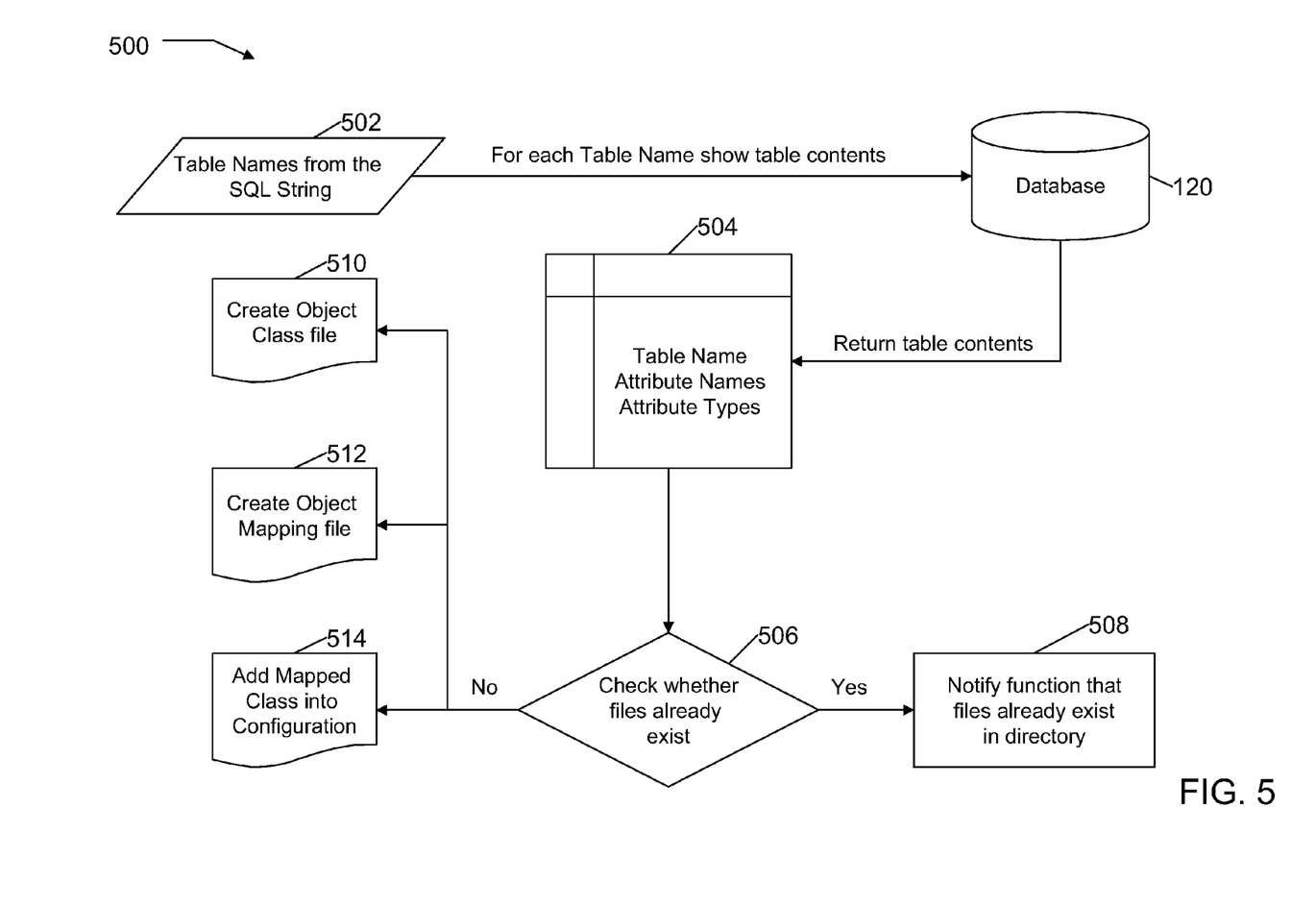
FIG. 5 is a flowchart illustrating a method for using table names in an SQL query string to find attribute names, and attribute types; which are used in creating class files and mapping files; and updating the configuration file used by at least one of an object and a relational persistent query service.

FIG. 5 is a flowchart 500 that illustrates a method for retrieving table contents from an SQL relational database where the retrieved table contents are used to find currently existing related files or create related files to the request received at the server 110 (shown in FIG. 2).

During the pre-fetch 414 of FIG. 4 of table columns, table names from the received 402 SQL query request are used to search 502 the relational database 120 (also shown in FIG. 2). The relational database 120, returns 504 the contents associated with each of the tables names to the application executing on the server 110. The contents returned 504 may be any contents associated with the table names in the SQL query string such as, for example, Table Name, Attribute Name, and Attribute Type. Once the contents of the table name search have been returned 504, the server 110 determines 506 if the necessary related files already exist. If the server 110 determines 506 that the related files already exist, the server 110 notifies 508 the executing function that the related files exist and returns the directory names associated with each of the related files.

If the server 110 determines 506 that at least one of the related files does not exist, the server 110 creates or adds information to existing files. In one embodiment, the server 110 creates 510 an object class file based on the table name, attributes, attribute types and relationships in the parsed SQL query, creates 512 an object mapping file based on the table name, attributes, attribute types and relationships in the parsed SQL query, and adds 514 the mapped class to the existing configuration file used by the at least one of an object and a relational persistent query service. This process is repeated for each table name in the parsed SQL query.

Figure 6:
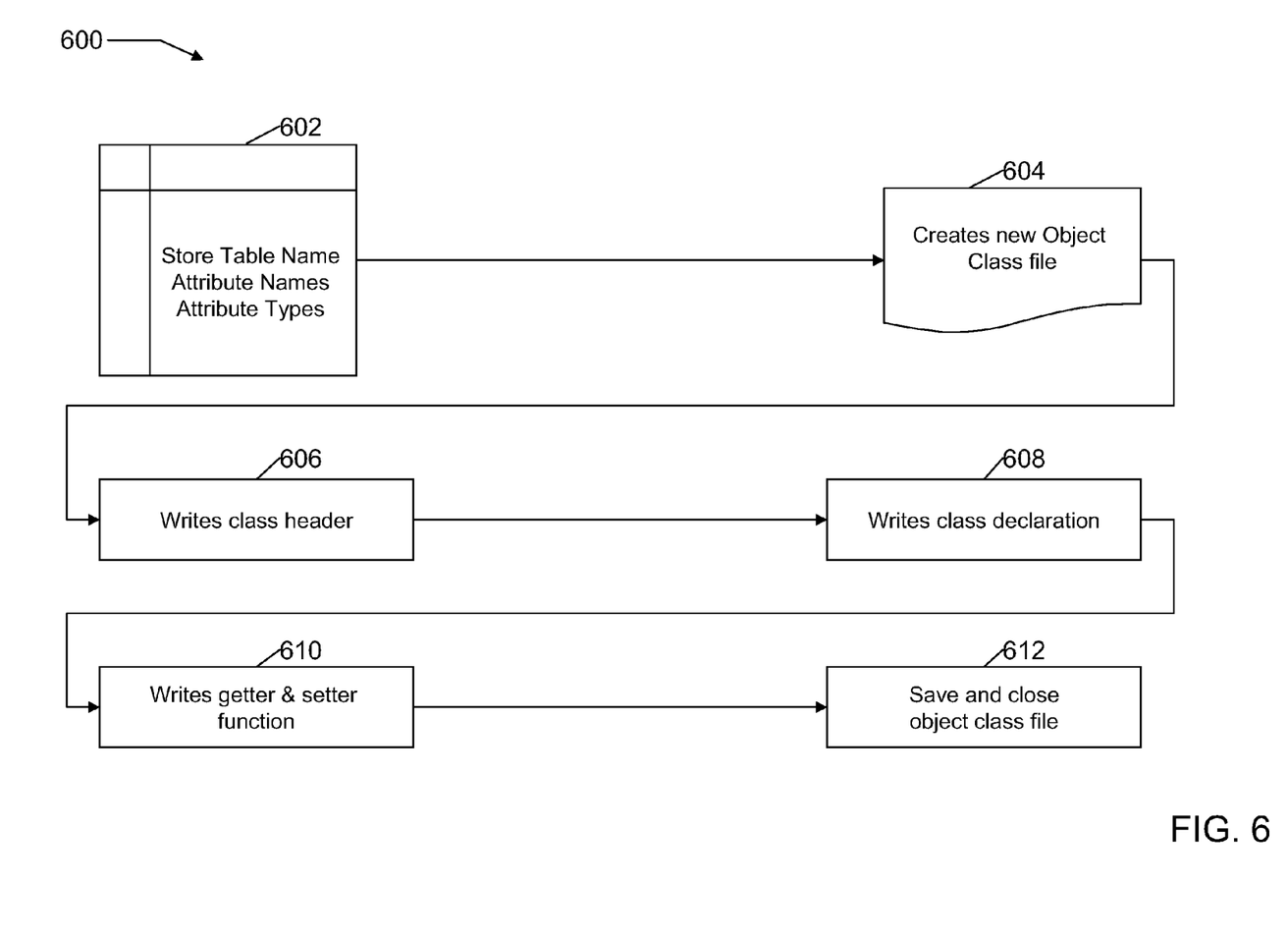
FIG. 6 is a flowchart illustrating a method for creating a new object class file utilizing a table name, attribute names and attribute types in the SQL query request.

FIG. 6 is a flowchart 600 that illustrates a method for creating the object class files for the SQL query at the server 110 (shown in FIG. 2). After the relational database 120 (shown in FIGS. 1, 2, and 5) has returned the table contents related to an SQL query string, the attributes including table name, attribute names and attribute types are stored 602 in a memory. The server 110 takes as input the table name to create 604 a new object class file. The object class file is opened and the server 110 writes 606 a class header into the object class file. For each attribute name and type, the server 110 writes 608 a class declaration by appending the class declaration for each attribute into the object class file. Further, the server 110 writes 610 a getter and setter function for each of the attribute names and types into the object class file. Once each of the class header, class declarations for each of the attribute names and types, and getter and setter functions for each of the attribute names and types have been stored in the object class file, the server 110 saves 612 the object class file and closes the object class file.

Figure 7:
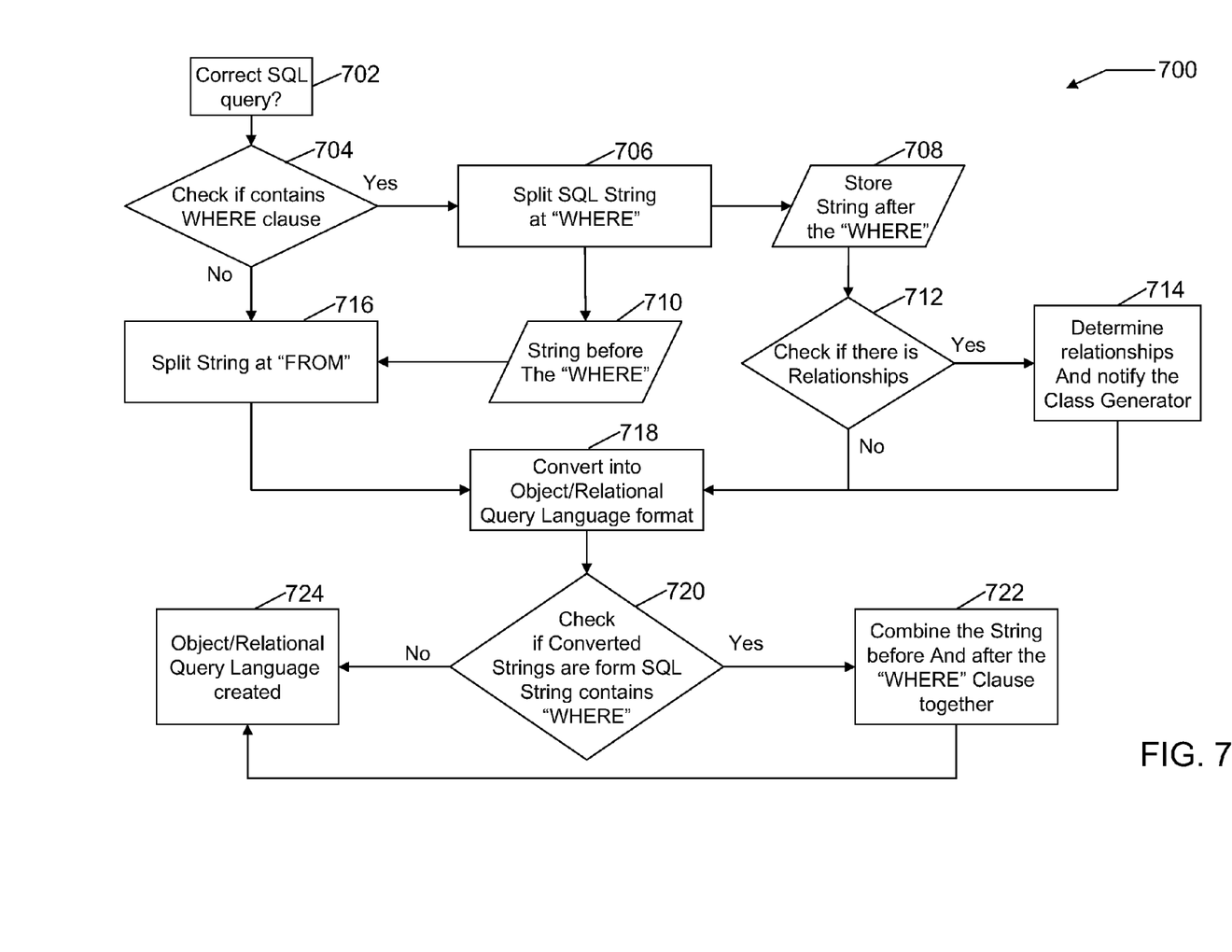
FIG. 7 is a flowchart illustrating a method for parsing an SQL query string which uses a "WHERE" clause.

FIG. 7 is a flowchart 700 that illustrates a method for parsing the SQL query which uses the "WHERE" clause, at the server 110 (shown in FIG. 2). Once the server 110 determines 702 the correctness of the SQL query 404 (shown in FIG. 4), the server 110 determines 704 if a "WHERE" clause exists in the correct SQL query string. If the server 110 determines 704 that a "WHERE" clause exists in the SQL query string, the SQL query string is parsed or split 706 at the "WHERE" keyword. The server 110, stores 708 the SQL query string after the "WHERE" clause in temporary memory. The server 110 also determines the contents of the string before the "WHERE" clause and stores 710 that string in a temporary memory location. The server 110 then determines 712 if there are relationships between the tables listed in the string 708. If it is determined 712 that a relationship exists 712, the relationships associated with the SQL query string after the "WHERE" are determined 714 and a class generation function executing in the server 110 is notified.

If the server 110 determines 704 that the SQL query string does not contain a "WHERE" clause, or if a "WHERE" clause exists in the string prior to the "WHERE" clause, the string is parsed or split 716 at the "FROM" keyword. Once the SQL query string has been parsed or split 716 at the "FROM" keyword, and there are no relationships determined 712 for the clause associated with the "WHERE" keyword or a relationship has been determined 714 and the class generator notified of the relationships, the SQL query string is converted 718 into the appropriate language format, for example, one or both of object query language format and relational query language format. Once the SQL query string has been converted 718 into the respective object and relational query language formats, the server 110 determines 720 if the converted query language query is from a SQL string that contains a "WHERE" clause. If the SQL query string contains at least one "WHERE" keyword, the SQL query string before and after the "WHERE" clause are combined 722, the query language request is created 724. If the query strings do not contain 720 a "WHERE" keyword clause, the query language request is created 724.

Figure 8:
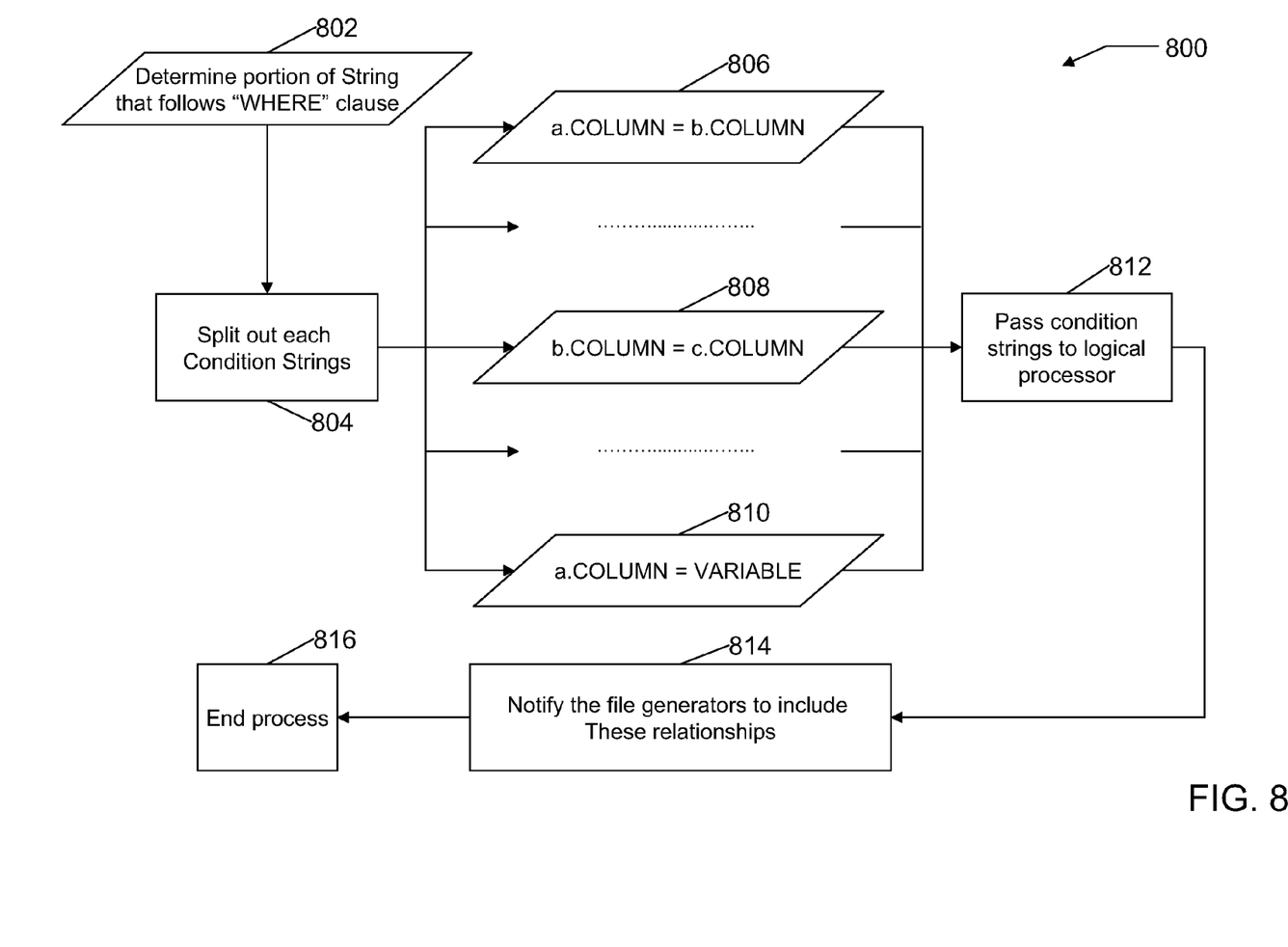
FIG. 8 is a flowchart illustrating a method for splitting out each conditional string in an SQL query string which is passed to a logical processor to determine relationships between tables associated with the SQL query string.

Now referring to FIG. 8, an exemplary flowchart 800 illustrates a method for parsing the string after the "WHERE" clause of a SQL query at the server 110 (shown in FIG. 2). The server 110 determines 802 the portion of the SQL query string that follows a determined "WHERE" clause. Each condition string following the "WHERE" clause is parsed or split 804 from the SQL query string by the server 110 creating a condition string. The server 110 determines each condition and attribute for the condition from the SQL query string following the "WHERE" clause. Examples of the condition strings are a.COLUMN=b.COLUMN 806; b.COLUMN=c.COLUMN 808 and a.COLUMN=variable 810, where "a", "b" and "c" are table names. It should be noted that this example is for illustration purpose only, and there could be more than three conditional strings in a "WHERE" clause. The condition strings are passed 812 to a logical processor. Once the logical processor determines the relationships from the condition strings, the file generator function executed in the server is notified 814 to include the relationships in the query of the relational database 120 (shown in FIG. 2). The process terminates 816 after notification 814 of the file generator function.

Figure 9:
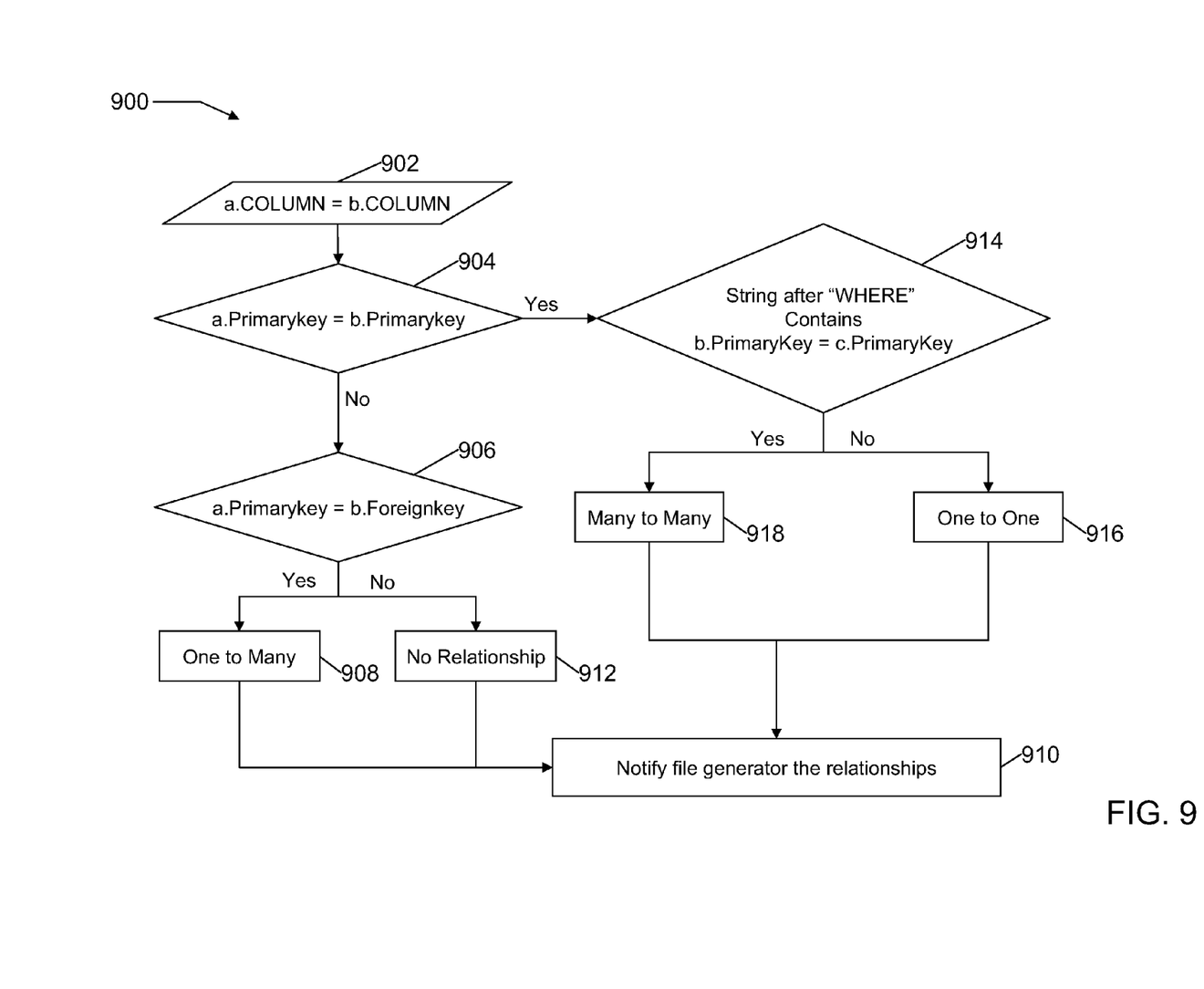
FIG. 9 is a flowchart illustrating a method for determining relationships between tables of an SQL database based on the conditional strings associated with an SQL query string.

FIG. 9 is a flowchart 900 that illustrates a method for determining relationships between tables of an SQL database based on the conditional strings associated with an SQL query string. The server 110 has determined 902 a condition clause follows the "WHERE" clause of a SQL query string, such as a.COLUMN=b.COLUMN 806; b.COLUMN=c.COLUMN 808 and a.COLUMN=VARIABLE 810. The preceding is but one illustrative example. The server 110 determines 904 if both portions of the condition string are primary keys for the tables "a" and "b" associated with the SQL query. If the server 110 determines 904 that one of the portions of the conditional string is not a primary key, the server determines 906 if one portion of the conditional string is a primary key and if a second portion of the conditional string is a foreign key. If the server 110 determines 906 that one portion of the conditional string is a primary key and a second portion of the conditional string is a foreign key, the condition is determined 908 to be a one-to-many relationship and the file generator function is notified 910 of the relationship. If the server 110 determines 906 that one portion of the conditional string is not a primary key or a second portion of the conditional string is not a foreign key, the condition is determined 912 to have no relationship and the file generator function is notified 910 of the non-relationship.

If at the server 110, the first condition is determined 904 to have a first portion and second portion of the first conditional string to both be primary keys, the server determines 914 if the second conditional string contains a primary key in a first portion equal to one of the primary keys contained within the first conditional string and a primary key in a second portion not equal to one of primary keys in one of the portions of the first conditional. If the second conditional contains 914 a primary key which is the same as one of the primary keys in the first conditional string and the second portion of the second conditional string is not equal to one of the primary keys of the first conditional string, the relationship is marked 916 as a one-to-one relationship and the file generator function is notified 910 of the relationship. If the server 110 determines 914 that second conditional string has a first portion which is the same as one of the primary keys of the first conditional string and the second portion of the second conditional string is equal to that primary key of the first conditional string, the relationship is marked 918 as a many-to-many relationship and the file generator function is notified 910 of the relationship.

Prior attempts have been made which automate the process of accessing a relational database using object relational mapping framework/software; however, those attempts have been based on using database schemas. The above described embodiments are dynamic in the sense that it uses the SQL query to determine the tables, attributes and attribute types and generates object class files and object mapping files. In addition, the described embodiments distinguish between a "requested query" and a "translated query". A requested query is used to determine table names, attributes and attribute types; whereas the translated query is used by the object relational framework software. A set of related files is always generated, including at least one object class file and at least one object mapping file.

The order of execution or performance of the operations in illustrated embodiments and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the contemplated scope.

A computing device or computer such as described herein has one or more processors or processing units and a system memory. The computer typically has at least some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although described in connection with an exemplary computing system environment, various embodiments are operational with numerous other general purpose or special purpose computing system environments or configurations. The computing system environment is not intended to suggest any limitation as to the scope of use or functionality of any aspect. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments may be described in the general context of computer-executable instructions, such as program modules, executed by one or more computers or other devices. Aspects of the invention may be implemented with any number and organization of components or modules. For example, the disclosure is not limited to the specific computer-executable instructions or the specific components or modules illustrated in the figures and described herein. Other embodiments may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose various embodiments, including the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method, for automating the process of querying a relational database using at least one of an object and a relational persistent query service on a processor, the method comprising:

receiving a request from a user for information from the relational database;

translating the received request to at least one of an object and a relational persistent query;

determining if a class associated with a table name already exists in a directory, wherein upon determining the class associated with the table name does not already exist in a directory comprises:

performing a pre-fetch for one or more table columns on the relational database; and creating classes and other related files for the query using the table names and the table columns;

parsing the query to determine one or more of table names, attributes and attribute types;

generating at least one set of related files, based on the parsing of the query;

updating at least one object and relational persistent configuration file to accept the newly generated at least one set of related files for use by at least one of the object and the relational persistent query service; and executing at least one of the object and the relational persistent query service based on the at least one of the object and the relational persistent query, wherein the at least one of the object and the relational persistent query service is programmed to:

receive the translated query;

retrieve at least one result stored in at least one of an object cache and the relational database based on at least one of the translated query and the generated at least one set of related files; and transmit the results to the user.

2. The method of claim 1 wherein generating at least one set of related files, based on the parsing of the query comprises generating at least one object class file and at least one object mapping file.

3. The method of claim 1 wherein translating the received request to at least one of an object and a relational persistent query further comprises:
   determining that classes and other files have been correctly created.

4. The method of claim 1 wherein upon determining the class associated with the table name does not already exist in a directory, said method further comprises:
   generating class variables and functions;
   generating at least one mapping file that includes information consistent with information related to the mapping files, including identification numbers and tables with class properties;
   generating a cache configuration file that includes information consistent with the configuration of the object cache, the information including a default cache size, a store location, a life span, and an idle time; and
   adding one or more default properties into the updated at least one object and relational persistent configuration file and mapped out classes.

5. The method of claim 4 further comprising:
   determining if the classes and other related files have been created correctly; and
   returning an error message to a client computer via a network if either the classes or any of the other related files have been incorrectly created.

6. The method of claim 1 further comprising at least one of:
   determining and creating at least one object class file based on the requested query;
   determining and creating at least one object mapping file based on at least one object;
   determining at least one table name associated with the relational database based on the requested query; and
   determining an object mapping file based on the translated query.

7. The method of claim 1 further comprising:
   determining a result based on the translated data is not stored in the object cache;
   querying the relational database based on the translated query; and
   storing a result from the query of the relational database in the object cache.

8. A system for automating a process of querying a relational database using at least one of an object and a relational persistent query service, the system comprising:
   a partition;
   a cache area;
   a processor;
   a network accessible by at least one user, wherein the network is coupled to the partition; and
   a relational database, the relational database being coupled to the partition, the partition and the cache area being coupled to the processor, the processor being programmed to:
   receive a request from a user via the partition for information from the relational database;
   translate the received request to at least one of an object and a relational persistent query;
   determine if a class associated with a table name already exists in a directory and perform a pre-fetch for one or more table columns on the relational database and create classes and other related files for the query using the table names and the table columns upon determining the class associated with the table name does not already exist in a directory;
   parse the query to determine table names, attributes and attribute types;
   generate at least one set of related files based on the parsed query;
   update at least one configuration file for use by at least one of an object and a relational persistent query service; and
   execute at least one of an object and a relational persistent query service based on the at least one of an object and a relational persistent query, wherein the at least one of an object and a relational persistent query service is operable to receive the translated query, retrieve at least one result stored in at least one of the cache area or the relational database based on at least one of the translated query and the generated at least one set of related files, and transmit the results to the user.

9. The system according to claim 8 wherein the processor is programmed to:
   determine at least one object based on the requested query; and
   determine at least one object mapping file based on the at least one object.

10. The system according to claim 8 wherein the at least one set of related files comprises an object class file and an object mapping file.

11. The system according to claim 8 wherein to translate the received request to at least one of an object and a relational persistent query, the processor further programmed to:
    determine that classes and other files have been correctly created.

12. The system according to claim 8 wherein upon determining the class associated with the table name does not already exist in a directory, the processor further programmed to:
    generate class variables and functions;
    generate at least one mapping file that includes information consistent with information related to the mapping files, including identification numbers and tables with class properties;
    generate a cache configuration file that includes information consistent with the configuration of the cache, including a default cache size, store location, life span, and idle time; and
    add one or more default properties into the at least one updated configuration file and mapped out classes.

13. The system according to claim 12 wherein the processor is further programmed to:
    determine if the classes and other related files have been created correctly; and
    return an error message to a client computer via the network if either the classes or any of the other related files have been incorrectly created.

14. The system according to claim 8 wherein the processor is programmed to:
    determine and create at least one object class file based on the requested query;
    determine and create at least one object mapping file based on at least one object;
    determine at least one table name associated with the relational database based on the requested query; and
    determine an object mapping file based on the translated query.

15. The system according to claim 8 wherein the processor is programmed to:

determine a result based on the translated data is not stored in the cache area;

query the relational database based on the translated query; and store a result from the query of the relational database in the cache area.

16. An apparatus, comprising:

a partition comprising a network interface, the partition being operable to receive requests from a user and to query a relational database external to the apparatus;

an object cache communicatively coupled to said partition;

a processor communicatively coupled to the partition and comprising at least one of an object and a relational persistent query service running thereon, the apparatus being configured to:

receive a request for information from the relational database from a user via said partition;

translate the received request to at least one of an object and a relational persistent query;

determine if a class associated with a table name already exists in a directory and perform a pre-fetch for one or more table columns on the relational database and create classes and other related files for the query using the table names and the table columns upon determining the class associated with the table name does not already exist in a directory;

generate at least one set of related files based on the at least one of an object and a relational persistent query;

execute the at least one of an object and a relational persistent query utilizing said at least one of an object and a relational persistent query service, said at least one of an object and a relational persistent query service operable to retrieve at least one result stored in at least one of said object cache or said relational database based on at least one of the query and the generated at least one set of related files, said apparatus operable to transmit the results to the user through the partition.

17. The apparatus of claim 16, wherein said processor is programmed to determine at least one object mapping file based on at least one object within the object cache.

18. The apparatus of claim 16, wherein the processor is programmed to determine at least one table name associated with the relational database based on the requested query.

* * * * *